Figure 1:
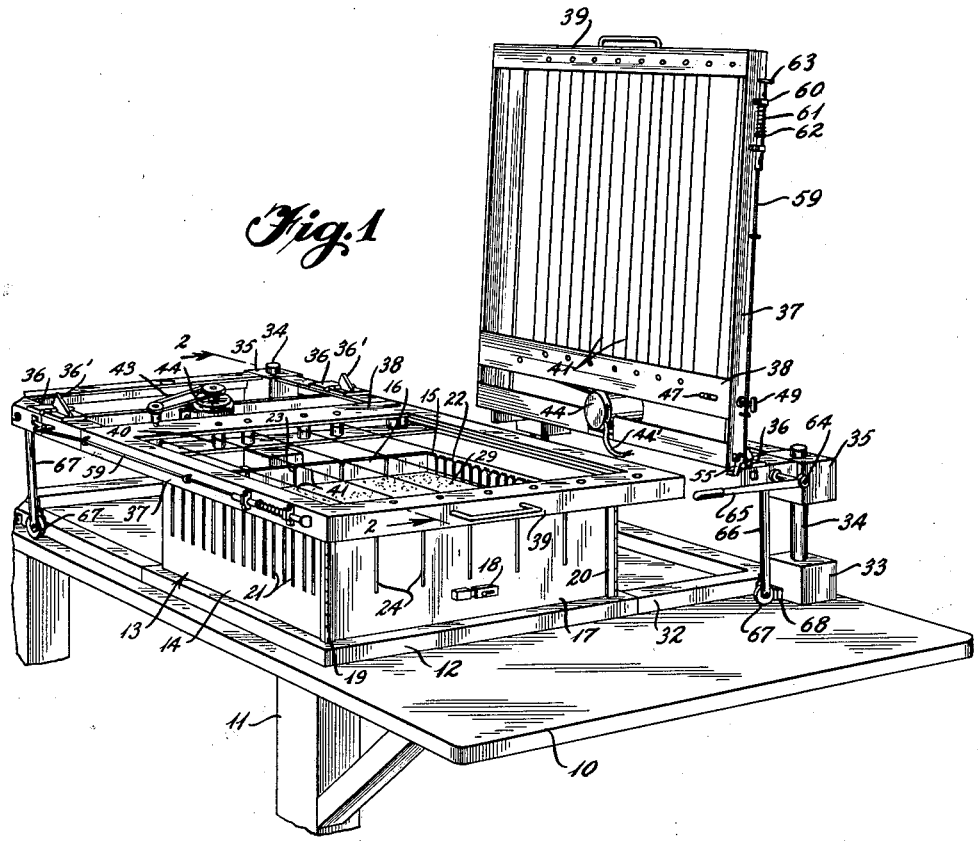

May 14, 1963  G. SPEARS  3,089,371
CAKE CUTTER HAVING POWER DRIVEN ENDLESS CUTTING WIRE
Filed Jan. 9, 1961  3 Sheets-Sheet 1

INVENTOR
Garfield Spears

BY
Ayates Dowell
ATTORNEY

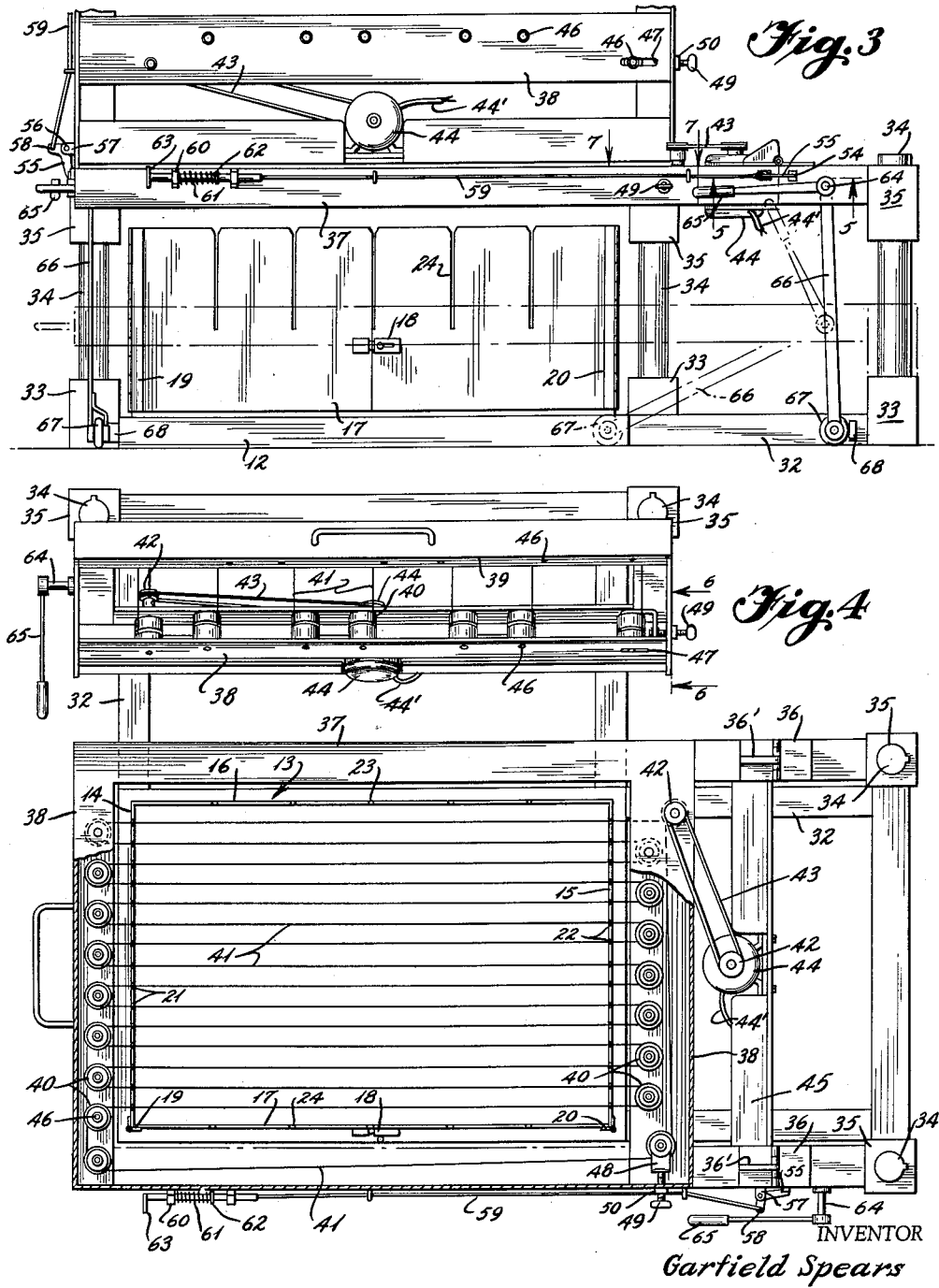

May 14, 1963 G. SPEARS 3,089,371
CAKE CUTTER HAVING POWER DRIVEN ENDLESS CUTTING WIRE
Filed Jan. 9, 1961 3 Sheets-Sheet 3
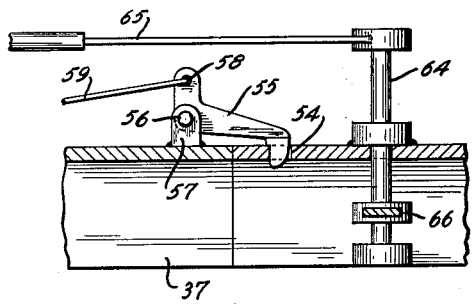
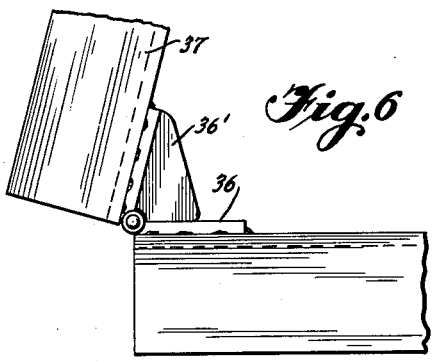
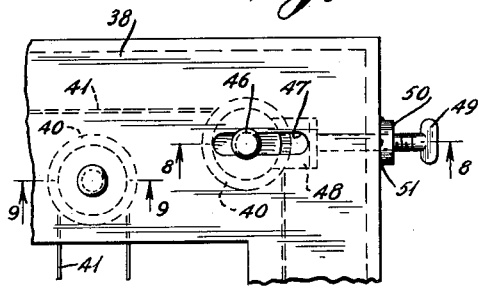
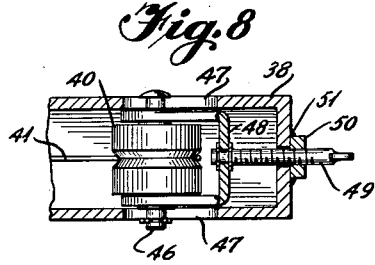
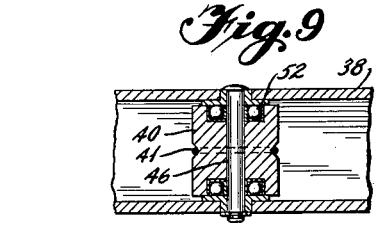
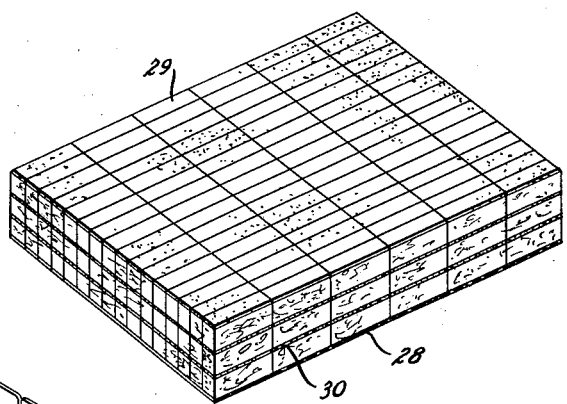
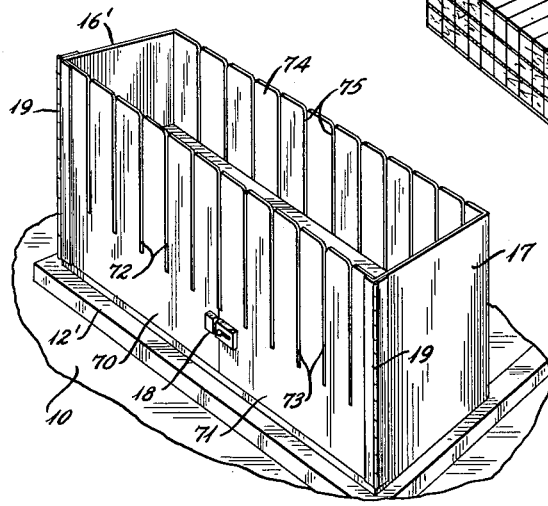
INVENTOR
Garfield Spears
BY
ATTORNEY United States Patent Office 3,089,371
Patented May 14, 1963

3,089,371
CAKE CUTTER HAVING POWER DRIVEN
ENDLESS CUTTING WIRE
Garfield Spears, 674 Rutherford Ave., Macon, Ga.
Filed Jan. 9, 1961, Ser. No. 81,285
7 Claims. (Cl. 83—201)

This invention relates to the preparation and cutting to size of foods intended for human consumption and to apparatus or equipment utilized in the preparation of such foods and the cutting of the same to obtain individual portions of the desired size and configuration.

The invention relates particularly to the baking of relatively soft foods such as cakes or the like in large sizes and the slicing or cutting into small portions of such cooked foods or cakes whether sponge, layer, jelly roll or other finished product and with or without icing.

Cake cutters heretofore used have not been satisfactory due to the fact that they were complicated, expensive, would not cut cooked and iced cakes, sponge cake, layer cake, fancy pastry, jelly rolls or the like, and because it was necessary to operate most of the cake slicers or cutters by hand.

It is an object of the invention to provide a cake cutter of simple construction, reasonably priced, power driven, and by which fully cooked cakes with or without icing can readily be cut to desired size and shape with a minimum of effort, in a minimum of time, and without loss from breakage or crumbling.

A further object of the invention is to provide a device by which a relatively large cake can be supported while being cut and thereafter while being transferred for packaging or the like.

Another object of the invention is to provide a cake cutter including a holder having upright kerfed walls which provide lateral support for the cake while it is being cut and with a cutting knife of wire strung back and forth around rollers in a mounting frame and adapted to secure the kerfs in such walls, and with power means for imparting endwise motion to such cutting wire, and with the walls of the holder provided with a door to afford access to the cake enclosure.

A further object of the invention is to provide a cake cutter, including a cake holder or enclosure having walls with vertical cuts or kerfs, which cutter can be readily placed on a table or other supporting surface and a cutting knife, having a frame and a cutting wire extending back and forth about rollers, operated to cause the cutting wire to enter the kerfs in the cake holder during the cutting of the cake and with means whereby the cutting knife can be supported, either in raised inoperative position, or secured in lowered operative position.

Figure 2:
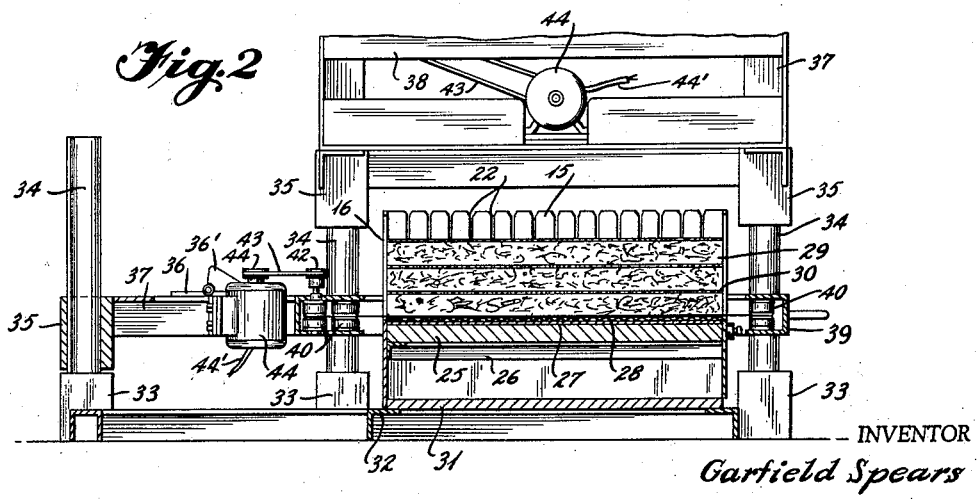

Other objects and advantages of the invention will be apparent from the following description taken in conjunction with the accompanying drawings, in which:

FIG. 1 is a perspective illustrating one application of the invention,

FIG. 2, a longitudinal section on the line 2—2 of FIG. 1,

FIG. 3, a front elevation,

FIG. 4, a top plan view partially in section,

FIG. 5, an enlarged detail section on the line 5—5 of FIG. 3,

FIG. 6, an enlarged detail elevation of one of the cutters,

FIG. 7, an enlarged fragmentary elevation on the line 7—7 of FIG. 3,

FIG. 8, an enlarged fragmentary detail on the line 8—8 of FIG. 7,

FIG. 9, an enlarged fragmentary detail on the line 9—9 of FIG. 7,

FIG. 10, a perspective of a three layer cake after it has been sliced, and

FIG. 11, a perspective of a modified form of a cake holding box.

Briefly stated, the cake cutter of the present invention is adapted to be supported upon a table or other surface and comprises a holder or enclosure of upright walls with sectional cuts or kerfs and adapted to fit about and provide lateral support on all sides for a cake or other substance which it is desired to cut into smaller size portions. A cutter or knife is provided, of wire extending back and forth around rollers in a frame, the wire being adapted to be moved into the kerfs of the holder in performing the cutting operation. The cutter frame is pivotally mounted in a position to be disposed in inoperative raised position or in lowered operative postion and means is provided for moving the wire endwise during the cutting operation, the cutter wire preferably being endless and extending around a driving pulley powered by a motor. Two of such cutter frames may be provided for producing two or more sets of cuts with one set at an angle to the other.

The cake cutter of the present invention is adapted to rest upon any suitable support such as a table 10, having legs 11 preferably of a size to provide wrapping space beside the cake cutter for the cake cut.

A cake holder 13 is provided of spaced parallel upright end walls 14 and 15, and side walls 17 and 16. The side wall 17 is of double door type with a latch 18, the sections of the door being mounted by piano hinges 19 and 20 permitting the door to be opened to afford access to the interior of the cake holder. The walls 14 and 15 of the cake holder are provided with kerfs or guide slots 21 and 22, and the walls 16 and 17 are provided with guide slots 23 and 24 respectively.

The cake holder includes a cake supporting base 25 mounted on supports 26 attached within and to the walls 14, 15, 16, and 17 and on this base is mounted a relatively dense surface layer 27 on which a cake mounting cardboard 28 is adapted to rest. If desired the walls 14, 15 and 16 of the holder may be additionally reinforced by a bottom member 31.

The cake or other product to be cut may be composed of multiple layers 29 with icing 30 between and over the surface of the same, and of a predetermined size for slicing into smaller portions also of a predetermined size.

To the main frame 12 are attached one or more auxiliary frames 32 extending outwardly from the main frame and to each of which auxiliary frames is attached a pair of spaced mounting blocks 33 which carry spaced posts 34 with vertically slidable mounting blocks 35 thereon. To the spaced pair of blocks 35 are fastened by hinges 36 a cutting frame 37 on opposite sides 38 and 39 of which are mounted a series of rollers 40, around which an endless cutting wirebelt 41 extends back and forth or in serpentine fashion with parallel lengths of said wire extending between the frame members 38 and 39.

The wire 41 in addition to the rollers 40 also encircles a drive pulley 42 rotated by a belt 43 from a motor 44 on a cross frame member 45 fixed to the frame 37. The motor 44 is supplied with energy through conductors 44' from any suitable source. In view of the fact that the cutting wire 41 encircles the pulley 42 driven by the motor, the cutting wire is driven similarly to a belt so that when cutting is performed there is a movement of the wire relative to the material thus facilitating the cutting operation.

In order to maintain the endless cutting wirebelt 41 at the proper tension one of the pulleys 40 is carried on a pin 46 in a slotted portion 47 of the cutter frame 38, and a yoke 48 engaging opposite ends of the pin 46 has attached thereto a threaded wing stud 49 which extends through a nut 50 secured by welds 51 or other means to the frame 38. By rotating the wing stud 49 the roller 40 can be adjusted to tighten or loosen the endless cutting wirebelt 41. The rollers 40 preferably are supported by bearings 52 on the pin 46.

In order to secure the cutter in a lowered cutting position the cutting frame is provided with an opening 54 (FIG. 5) in which the tip of a latch 55 is adapted to engage, such latch being secured by a pivot 56 on a boss 57, the latch 55 having an opening 58 in which an operating member 59 is secured. The operating member 59 extends between spaced bosses 60 on the side of the frame 37 and with a spring 61 bearing against a collar 62 and urging the operating member 59 towards one extreme position maintaining the latch in locked position, a handle 63 being provided which can be manipulated for unlocking the latch. The hinge 36 has a stop member 36' limiting its movement and the elevating movement of the frame 37.

In order that the cutting frame may be in elevated position when not in use it is provided with a shaft 64 having an arm 65 and a depending leg 66 with a roller 67 on the lower end of the same adapted to engage a stop 68 carried by the auxiliary frame 32. In the position illustrated in FIG. 1 the leg 66 is upright and the roller 67 is against the stop 68 and the top surface of the table 10, in which position the cutter frame 37 will be locked in elevated position. Upon release of the latch the cutter frame may be caused to swing downwardly to horizontal position where it may be locked by the latch 55. In so doing the lever 65 will be swung upwardly carrying with it the leg 66 whereupon the cutter frame can move downwardly with the blocks 35 sliding on the posts 34. The motor can then be operated to drive the cutting wire to perform the cutting operation.

In FIG. 11 is disclosed a modified holder or box by which cake can be sliced or cut in parallel cuts in a single direction. In this figure a frame 12' serves to mount end members 16' and 17' upon which are mounted, by means of a piano hinge 19, a pair of doors 70 and 71 with kerfs 72 and 73 for a cutter not shown but of the general character of that illustrated in FIG. 1. Opposite the doors 70 and 71 is an upright wall 74 having kerfs 75 arranged similarly to the kerfs 72 and 73 so that the lengths of the cutting wire may move downwardly therein.

In FIG. 10 is illustrated a three-layer cake 29 with icing 30 between the layers and with a cardboard base 28 beneath the cake, such cake already having been cut lengthwise and transversely into smaller portions.

It will be readily apparent from the foregoing that a practical power operated cake cutter is provided of a minimum number of parts, which can be readily placed on a table or other support and operated to cut cake in one or more directions, with a minimum of effort, in a minimum of time, and without loss from breakage or crumbling, the cake being supported while it is being cut and during the removal of the same.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. A cake cutter comprising a main frame, a cake holder mounted on said frame, and including a cake supporting base and upright walls for providing lateral support for the cake at each of the sides and having guide slots for the reception of cutting wires, at least one of said upright walls having a door for affording access to the interior of said holder, an auxiliary frame connected to and extending outwardly from said main frame, spaced supporting posts carried by said auxiliary frame, a vertically adjustable cutting frame pivotally mounted on said posts, said cutting frame having a series of parallel rollers on opposite sides thereof, a cutting wire extending around said rollers in a serpentine path back and forth across said cutting frame in parallel relation and extending around said rollers on opposite sides for performing the cutting operation, and motor means for moving the lengths of said cutting wire endwise, the lengths of said cutting wire being located in a position to enter said guide slots, means for limiting the downward motion of said cutting frame, and means for fastening said cutting frame in lowered cutting position and also for fastening said cutting frame in elevated position, whereby cutting of the cake may be accomplished at a different angle by a second cutting wire.

2. A cake cutter comprising a main frame, a cake holder mounted on said frame and including a cake supporting base and upright walls for providing lateral support about the cake at each of the sides and having guide slots in said walls for the reception of cutting wires, at least one of said upright walls including an outwardly swingable portion for affording access to the interior of said holder, at least one auxiliary frame connected to and extending outwardly from said main frame, spaced supporting posts carried by said auxiliary frames, at least one cutting frame having a series of rollers on opposite sides thereof carried by said auxiliary frame, a cutting wire extending in a serpentine path between the rollers on opposite sides of said cutting frame and substantially in parallel relation, said cutting frame being movable relative to said cake holder while retained in a substantially horizontal position to perform the cutting operation.

3. A cake cutter comprising main and auxiliary frames, a cake holder mounted on said main frame and including a cake supporting base and upright walls for providing lateral marginal support at each of the sides about cake to be cut, spaced posts carried by said auxiliary frame, a cutting frame mounted for raising and lowering movement on said posts, a series of rollers mounted on each of opposite sides of said cutting frame, a driving roller, an endless cutting wire extending back and forth in parallel relation around said series of rollers and said driving roller, motor means for driving said endless cutting wire, said upright walls having slots for receiving said cutting wires, means for limiting the downward movement of said cutting frame, and means for securing said cutting frame in raised inoperative position and in lowered operative position.

4. A cake cutter comprising a main and multiple auxiliary frames connected together, a cake holder mounted on said main frame and including a cake supporting base and upright walls for providing lateral marginal support at each of the sides for cake to be cut, a pair of spaced posts carried by each of said auxiliary frames, a cutter frame mounted for raising and lowering movement on each pair of spaced posts, a series of rollers mounted on opposite sides of each of said cutting frames, a cutting wire extending in a serpentine path back and forth around said rollers, motor means for moving said cutting wire endwise, said upright walls of said holder having slots in which said cutting wires are adapted to be received, means for limiting the downward movement of said cutting frame, and means for fastening said cutting frame in raised inoperative position and in lowered operative position.

5. A cake cutter comprising a main and multiple auxiliary frames connected together, a cake holder mounted on said main frame and including a cake supporting base and upright walls for providing lateral marginal support at each of the sides for cake to be cut, a pair of spaced posts carried by each of said auxiliary frames, a cutting frame mounted for raising and lowering movement while in a generally horizontal position on each pair of spaced posts, roller means mounted on opposite sides of each of said cutting frames, a cutting wire extending in a serpentine path back and forth across said cutting frames, motor means for moving said cutting wire endwise, said upright walls of said holder having slots in which said cutting wires are adapted to be received, means for limiting the downward movement of said cutting frame, and means for fastening said cutting frame in raised inoperative position and in lowered operative position.

6. A cake cutter comprising a supporting base, a pair of spaced posts mounted on said base, a vertically movable frame mounted on said posts, a first roller means mounted on said frame, a series of roller means located on opposite sides of said frame, said series of roller means on one side being offset from said first roller means and being staggered relative to the series of roller means on the opposite side, the series of roller means on each side being spaced apart a distance substantially corresponding with the diameter of one of said roller measn, an endless cutting wire extending in parallel paths back and forth across said frame and about said series of roller means, said cutting wire extending around said first roller means and along a path substantially normal to the parallel paths and back to said series of roller means, and means driving at least one of said roller means for moving said cutting wire endwise whereby one length of cutting wire will be substantially parallel with an adjacent length throughout said series of roller means and movable in the opposite direction.

7. The structure of claim 6 in which said driving means is connected to said first roller means.

References Cited in the file of this patent
UNITED STATES PATENTS

| | | |
|---|---|---|
| 525,211 | Holmes | Aug. 28, 1894 |
| 2,073,257 | Van Riper | Mar. 9, 1937 |
| 2,144,060 | Herschel | Jan. 17, 1939 |
| 2,526,650 | Gaibel | Oct. 24, 1950 |
| 2,557,504 | Holmes | June 19, 1951 |
| 2,592,657 | Cierley | Apr. 15, 1952 |
| 2,920,520 | Duba | Jan. 12, 1960 |
| 2,978,777 | Carlsson | Apr. 11, 1961 |

FOREIGN PATENTS

| | | |
|---|---|---|
| 15,461/33 | Australia | Sept. 13, 1934 |
| 630,451 | Great Britain | Oct. 13, 1949 |